(12) United States Patent
Hibbard

(10) Patent No.: US 8,177,514 B2
(45) Date of Patent: May 15, 2012

(54) WIND TURBINE BLADE

(75) Inventor: Paul Hibbard, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/895,331

(22) Filed: Sep. 30, 2010

(65) Prior Publication Data

US 2011/0081247 A1 Apr. 7, 2011

Related U.S. Application Data

(60) Provisional application No. 61/247,758, filed on Oct. 1, 2009.

(30) Foreign Application Priority Data

Oct. 1, 2009 (DK) .................................. 2009 01073

(51) Int. Cl.
F03D 1/06 (2006.01)

(52) U.S. Cl. ........................................................ 416/226

(58) Field of Classification Search .................. 416/226, 416/233, 225
See application file for complete search history.

(56) References Cited

U.S. PATENT DOCUMENTS

| 2,259,247 A * | 10/1941 | Dornier ......................... 416/226 |
| 5,401,138 A * | 3/1995 | Mosiewicz ................... 416/226 |
| 7,165,945 B2 * | 1/2007 | Kovalsky et al. .............. 416/226 |
| 7,854,594 B2 * | 12/2010 | Judge ............................. 416/226 |
| 2009/0068017 A1 | 3/2009 | Rudling |
| 2009/0169390 A1 | 7/2009 | Nies |
| 2011/0091326 A1 * | 4/2011 | Hancock ........................ 416/225 |

FOREIGN PATENT DOCUMENTS

| GB | 2157248 | 10/1985 |
| JP | 2004011616 A * | 1/2004 |
| WO | WO 2006/002621 | 1/2006 |
| WO | WO 2008/012615 | 1/2008 |
| WO | WO 2008/084126 | 7/2008 |
| WO | WO 2008/089765 | 7/2008 |
| WO | WO 2009/034291 | 3/2009 |

OTHER PUBLICATIONS

Dutton et al., Design concepts for sectional wind turbine blades, *European Wind Energy Conference*, (1999) pp. 285-288.
Examination Report from Danish Patent Office dated May 17, 2010.

* cited by examiner

*Primary Examiner* — Richard Edgar
(74) *Attorney, Agent, or Firm* — Wood, Herron & Evans, L.L.P.

(57) ABSTRACT

A sectional blade for a wind turbine comprising a first and a second blade section extending in opposite directions from a blade joint, and each blade section comprising a spar section forming a structural member of the blade. The blade sections are structurally connected by a spar bridge over a spar joint, which comprises a center beam of two extending beam caps joined by one or more extending beam webs. The spar joint further comprises at least two extending spar caps and one or more extending spar webs connecting the spar caps to opposite sides of the center beam. A method of manufacturing such a sectional blade is also disclosed.

20 Claims, 3 Drawing Sheets

WIND TURBINE BLADE

RELATED APPLICATIONS

This application claims priority from Denmark Application No. PA 2009 01073 which was filed on Oct. 1, 2009 and U.S. Provisional Application No. 61/247,758 filed on Oct. 1, 2009, the content of which are incorporated by reference.

FIELD OF THE INVENTION

The present invention relates to a sectional blade for a wind turbine, the blade comprising at least a first and a second blade portion extending in opposite directions from a joint.

BACKGROUND

Modern wind turbines comprise a plurality of wind turbine rotor blades, typically three blades, each blade having a weight of up to 15 tons and a length of up to 55 meters or longer.

Traditionally, a blade comprises two shell parts, one defining a windward side shell part and the other one defining a leeward side shell part. Each of the shell parts are traditionally made in one piece. To reinforce such a blade, a beam- or box-shaped, tubular, and longitudinal element, such as a spar, can act as a reinforcing beam running lengthwise, i.e. in the longitudinal direction of the blade. The spar is located in the cavity between the two wind turbine shell parts and extends substantially throughout the length of the shell cavity in order to increase the strength and stiffness of the wind turbine blade. A blade may further be reinforced by two or more spars placed lengthwise side by side.

As the size of wind turbines and thus wind turbine blades are still growing, the production facilities and the transport means must be increased to handle blades of the required size. This also increases the demand on logistics and increases the associated costs.

DESCRIPTION OF THE INVENTION

It is an object of embodiments of the present invention to provide an improved wind turbine blade comprising at least two portions and to provide an improved method of manufacturing such a blade. In a first aspect, the invention provides a sectional blade for a wind turbine, the blade comprising at least a first blade section and a second blade section extending in opposite directions from a blade joint, where each blade section comprises a spar section forming a structural member of the blade and extending lengthwise, the first blade section and the second blade section being structurally connected by a spar bridge extending into both blade sections to facilitate joining of said blade sections, and where the spar bridge is connected in a spar joint to a spar section thereby forming a receiving spar section. The spar joint comprises a center beam extending lengthwise of at least two beam caps joined by one or more beam webs, and the spar joint further comprises at least two spar caps extending lengthwise and one or more spar webs extending lengthwise and connecting the spar caps to opposite sides of the center beam.

The blade sections may be smaller than normal blade shells, and the blade sections may be easier to transport from a manufacturing site to an assembly site for being assembled, compared to blades in one piece. Furthermore, the assembly site can be situated close to the place where the turbine blade is to be used.

By manufacturing the blade of different parts, these parts may be transported unassembled, thereby facilitating transport with the possibility of reducing the associated costs.

Further, the possibility to manufacture the turbine blade in sections may reduce the manufacturing costs in that the blade mold sizes may be correspondingly reduced and thereby the demands to the space required during manufacture as well as to the equipment for moving around and handling the blade sections and molds.

In the context of the present invention the term "spar bridge" shall be understood as a member extending between two neighboring blade sections which member serves the function of interconnecting the two blade sections and which serves the purpose of joining the two sections. The spar bridge may be a separate member or may form an integral part of or be fastened to one of the two neighboring blade sections. When assembled, the first blade section and the second blade section are structurally connected by at least one spar bridge extending into both blade sections to facilitate joining of said blade sections.

The spar bridge may be a longitudinal element which may be box-shaped, cylindrical, or of any other shape such as, for example, an I-beam shape or quadrangular. It may form part of the longitudinal strength and bending stiffness of the wind turbine blade, thus being part of the reinforcement of the blade.

Furthermore, the spar bridge may be a solid, a partly solid, or a tubular element. It should be understood, that by "tubular element" is in this connection meant a hollow element with an elongated shape. The shape may be non-uniform. The inner geometry may (if any) be different from the outer shape.

The spar sections may have an elongated form and may be hollow.

In the context of the present invention the term "cap" shall be understood a member such as a flange on a beam or a spar leg extending in a longitudinal direction and oriented transversely to a web connecting any such caps. The cap member primarily acts to carry loads in tension and in compression. The extending spar or beam caps may form an upper and a lower surface of a substantially rectangular form, or the flanges of an I-beam. These caps may thus be joined with the one or more webs being positioned substantially vertically to form sections being substantially rectangular or I-beam shaped.

By the blade joint according to the invention comprising both a center beam of two or more beam caps joined by one or more beam webs, and of two or more spar caps connected to either side of the center beam via spar webs, is obtained a joint of high bending stiffness and strength in two directions,—i.e. both in the direction of the beam web and in the direction of the spar web. Accordingly, any loads on the blade are transferred or carded over the blade joint providing a stronger blade joint and a blade of more predictable and controllable stiffness properties. Further, both the beam caps and the spar caps are connected in shear via the connecting webs and therefore act jointly and not as independent cantilevers over the joint length. Any rotations or moments of the blade are thereby transferred over the entire length of the connected blade joint and the moments and loads at both ends of the blade joint are reduced compared to a joint without such shear connection. Thus, the risk of damage in the blade near the blade joint is reduced and the expected life time of the blade joint is increased correspondingly.

When joining two blade portions, shear forces may occur between these blade portions when the blade rotates. It may thus be an advantage, if the spar sections are dimensioned relative to each other so that shear forces between one of the spar sections and the spar bridge can be transferred directly over the webs in the blade joint. The spar sections may be optimised both for a dominant flapwise bending moment from aerodynamic thrust loads and for the lesser edgewise gravity dominated loads.

The blade may comprise more than one joint and thus comprise more than two blade sections and more than one spar bridge for each joint.

Each blade section may comprise two shell parts, one defining a windward or lower side shell part and the other one defining a leeward or upper side shell part. These shell parts may be assembled before joining the first and second blade sections.

The spar bridge may in one embodiment form an integral part of the first spar section, and the second spar section may be adapted to receive the spar bridge over a spar joint length so as to secure the spar bridge to the second spar section in the spar joint and may thus not be a separate element. Furthermore, the spar bridge may comprise an extension protruding from one of the spar sections and may thereby form an extending spar section.

In a further embodiment, the spar bridge may form a separate member, and each of the first and the second spar sections may be adapted to receive the spar bridge over a spar joint length so as to secure the spar bridge to the first and second spar sections in spar joints. Thus, the length of the second blade section is reduced compared to if the spar bridge extends or protrudes there from.

In yet a further embodiment of the sectional blade the beam caps are oriented in a direction transverse to the spar caps and/or the beam web is oriented in a direction transverse to the spar web. For instance, the spar caps (extending in the longitudinal direction of the blade) may be oriented with their principal direction of the caps or flanges in a substantial chord-wise direction, and the beam caps may be oriented with their principal direction of the caps or flanges in a direction substantially perpendicular to the chord-wise direction, or vice versa. Thus, the center beam of the beam caps and web provides maximum bending stiffness in one direction while the beam built up from the spar caps and spar web provides maximum stiffness in the transverse direction. As an example the beam caps may be oriented in a chordwise direction of the blade substantially following a part of the upper and lower shell parts. In such an arrangement, the spar caps joined by the spar web provide high stiffness under flapwise bending of the blade. The center beam then oriented with the beam caps transverse to the spar caps and extending between the lower and upper blade shell sides likewise provides high stiffness under edgewise bending of the blade.

In another embodiment the spar caps are oriented transversely to the chordwise direction and extend between the lower and upper shell parts whereas the beam caps are positioned transversely thereto in the chordwise direction of the blade.

The spar bridge may comprise the center beam, and the receiving spar section may comprise the at least two spar caps, whereby the center beam becomes the part protruding from one blade section and extending into the receiving blade section. During assembly the center beam is then inserted and attached to the at least to spar caps positioned on both sides of the center beam.

Alternatively the receiving spar section may comprise the center beam, and the spar bridge may comprise the at least two spar caps.

In either case the at least one spar web may form a part of the center beam or be connected to the spar caps prior to the joining of the blade sections.

The center beam may be of any longitudinal shape with caps or flanges connected by webs such as, for example, box-shaped or I-shaped, and may include rounded corners. It may form part of the longitudinal strength and bending stiffness of the wind turbine blade, thus being part of the reinforcement of the blade. Furthermore, the center beam may be a solid, a partly solid, or a tubular element. It should be understood, that by "tubular element" is in this connection meant a hollow element with an elongated shape. The shape may be non-uniform. The inner geometry may (if any) be different from the outer shape.

As an example the spar joint in the sectional blade may comprise two interconnected I-beams yielding a Maltese-cross like shape and providing high bending stiffness properties in the two crosswise directions.

Further, both the spar web and the beam web may be oriented to pass through the centroid or geometric center, or barycenter of a cross section of the sectional blade comprising the spar joint. This provides a joint of increased stiffness as the webs or arms of the cross-like joint may act to transfer edgewise loads through the centroid and under compression resulting in no or minimal rotations.

The blade may further comprise a fastening element adapted to fasten the spar bridge to the receiving spar section. As an example, the fastening element may comprise a bolt, a rivet or the like, extending transverse to the length of the spar section and the spar bridge, and through both of them to facilitate fixing of the spar bridge to the spar section in question, such as, for example, by attaching a nut to one end of the bolt. As a single bolt or rivet may in some embodiments not be sufficient to fix the spar bridge to the receiving spar section, the fastening element may comprise a plurality of bolts, rivets, or other fixing elements.

Alternatively or additionally, the fastening element may comprise one or more bolts, rivets or the like extending longitudinal to the length of the spar section and the spar bridge.

As a further alternative, the fastening element may comprise an adhesive adapted to bond the receiving spar section and the spar bridge together at least partly.

Other fastening elements may also be used. The above examples of fastening elements may be used separately or may be combined.

Further, the sectional blade may comprise a number of fastening elements provided at intervals along the spar joint length, thereby increasing the shear transfer between the spar caps over the one or more spar webs.

Alternatively or in addition hereto, the fastening elements may be provided near both ends of the spar joint lengthwise, thereby reducing the relative movement of the spar caps at the ends of the blade joint otherwise resulting in local loads and damage near the blade joint ends. Furthermore, by fastening the spar bridge to the receiving spar section near both lengthwise ends of the spar joint, the bending and torsion loads are transferred over the entire blade joint length thereby maximising the blade joint stiffness and strength.

Further, the at least two spar caps may be positioned a maximum distance apart within the sectional blade. Particularly, the spar caps may be placed as close to the leading and trailing edges of the blade as possible for the given size of spar caps and taking into account the deformations of the caps during operation of the blade. Or as close to the upper and lower sides of the blade shell as possible. Thus, the bending stiffness of the blade joint in the direction of the one or more spar webs connecting the spar caps is maximized for a given size of caps and for that specific position of the blade joint along the length of the blade.

At least one of the spar sections may form part of an aerodynamic outer surface of the blade. Thus, at least one of the spar sections may not be completely encapsulated within the turbine blade shell parts. Hence, the spar may be more easily transported from a manufacturing site to an assembly site compared to large blade shells or complete blades. The assembly site can be situated close to the place where the turbine blade is to be used. Further, less material may be used in the blade design by letting a spar section form part of an aerodynamic outer surface of the blade.

As it may be an advantage if the first and second blade portions can be separated again after joining them, the spar joint may facilitate disassembling and non-destructive separation of the blade sections from each other. This may especially be an advantage if a part of the blade needs repair or has to be replaced, as only the blade portion comprising the part in question needs to be replaced.

The joint may be approximately at the middle part of the blade providing blade sections of approximately the same length. However, the blade portions may also be of different length. As an example, the first blade section may define a main blade portion, whereas the second blade section may define a tip portion.

In an embodiment of the invention the second blade section may form a winglet. Winglets can attain different shapes such as, for example, a sharply bent tip in an angle from a few degrees to 90° relative to the lengthwise direction of the blade, or such as a gradually bent tip. Thus, the blade may be transported in parts which may, for example, be relatively flat compared to a traditional blade with winglet, thereby facilitating transport with the possibility of reducing the associated costs.

The blade tip influences the performance of the wind turbine blade as well as the noise emission. By detachable mounting of the winglet to the rest of the blade, the blade tip may be exchanged on existing wind turbines to thereby adjust the wind turbine performance or noise emission by attaching tips extending in different angles relative to the lengthwise direction of the blade or tips of different size and/or shape. Also, as the blade tip is often vulnerable to damage during transport, handling, or operation, a detachable blade tip or winglet according to the above may furthermore be advantageous in facilitating the exchange of a damaged blade tip. Advantages of such an arrangement may be the facilitation of transport and the possibilities of retrofitting or repair of the blade tip as described previously.

In a second aspect, the invention provides a method of manufacturing a sectional blade for a wind turbine according to any of the above, the method comprising the steps of:
providing a first blade section and a second blade section;
arranging the blade sections so that they extend in opposite directions from a joint; and
structurally connecting the blade sections by use of a spar bridge.

It should be understood, that the features of the above-described first aspect of the invention may be applicable in relation to steps of the method of the second aspect of the invention.

In a third aspect, the invention provides a wind turbine comprising a sectional blade according to the first aspect of the invention. The sectional blade may be manufactured according to the second aspect of the invention. It should be understood, that the features of the first and second aspects previously described may also be applicable to the third aspect of the invention.

BRIEF DESCRIPTION OF THE DRAWINGS

In the following different embodiments of the invention will be described with reference to the drawings, wherein.

DETAILED DESCRIPTION OF THE DRAWINGS

Further scope of applicability of the present invention will become apparent from the following detailed description and specific examples. However, it should be understood that the detailed description and specific examples, while indicating preferred embodiments of the invention, are given by way of illustration only, since various changes and modifications within the scope of the invention will become apparent to those skilled in the art from this detailed description.

Figure 1:
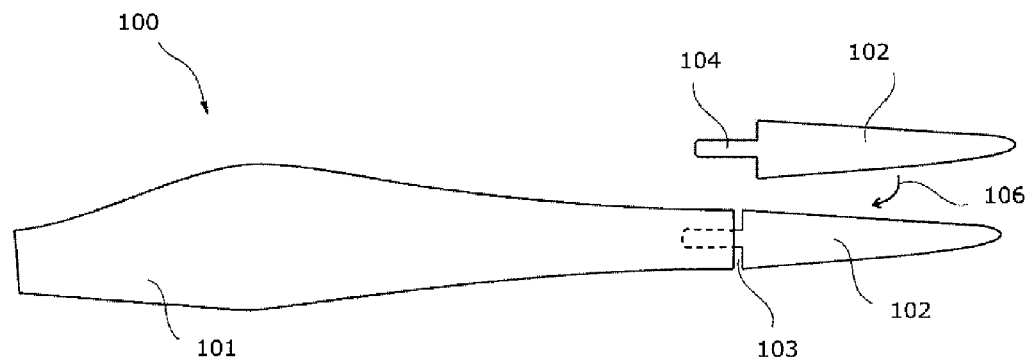
FIG. 1 illustrates an embodiment of a sectional blade comprising a first and a second blade section.

FIG. 1 shows a sectional blade 100 for a wind turbine according to one embodiment of the invention. The blade 100 comprises at least a first blade section 101 and a second blade section 102 extending in opposite directions from a joint 103. The first blade section 101 and the second blade section 102 are structurally connected by at least one spar bridge 104 extending into both blade sections 101, 102 to facilitate joining of said blade sections 101, 102.

The arrow 106 illustrates that the sectional blade 100 in the illustrated embodiment comprises two blade sections 101, 102, and that these blade sections 101, 102 are joined by inserting the spar bridge 104 into the first blade section 101.

The illustrated spar bridge 104 is a longitudinal beam element. It forms part of the longitudinal strength of the wind turbine blade 100, thus forming part of the reinforcement of the blade 100. Further, the spar bridge 104 in extending into both blade sections acts to carry and transfer bending loads of the blade across the blade joint.

Figure 2:
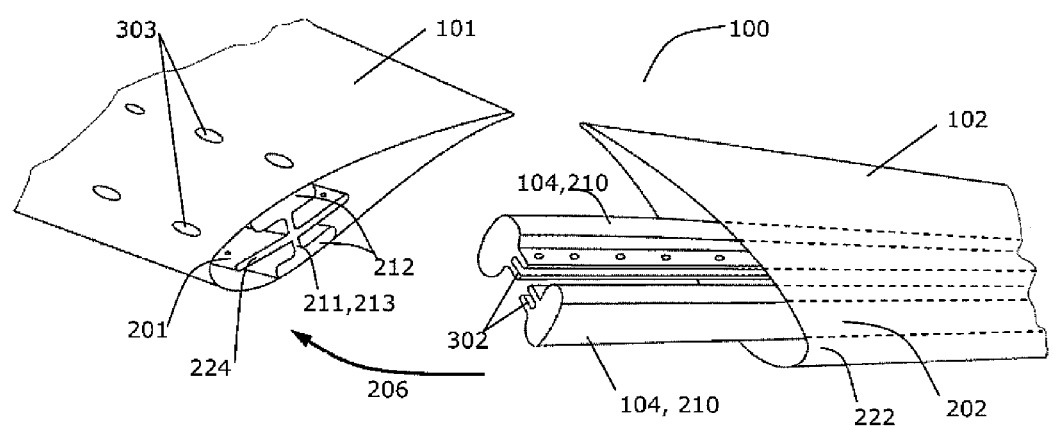
FIG. 2 illustrates an example of a joint between two blade sections.

As illustrated in FIG. 2 each blade section 101, 102 comprises a spar section 201, 202 forming a structural member of the blade 100 and running lengthwise, i.e. in the longitudinal direction of the blade 100. The spar sections 201, 202 are joined by the spar bridge 104. It should be understood, that for illustration purposes only parts of the blade sections 101, 102 are shown.

In the illustrated embodiment, the spar bridge 104 forms part of one of the blade sections 101, 102 and is consequently not a separate element. As illustrated, the spar bridge 104 forms part of the second blade section 102, and comprises an extension protruding from the second spar section 202, thereby forming an extending spar section. The first spar section 201 is adapted to receive and connect to the extension, and thereby forms a receiving spar section.

Figure 3:
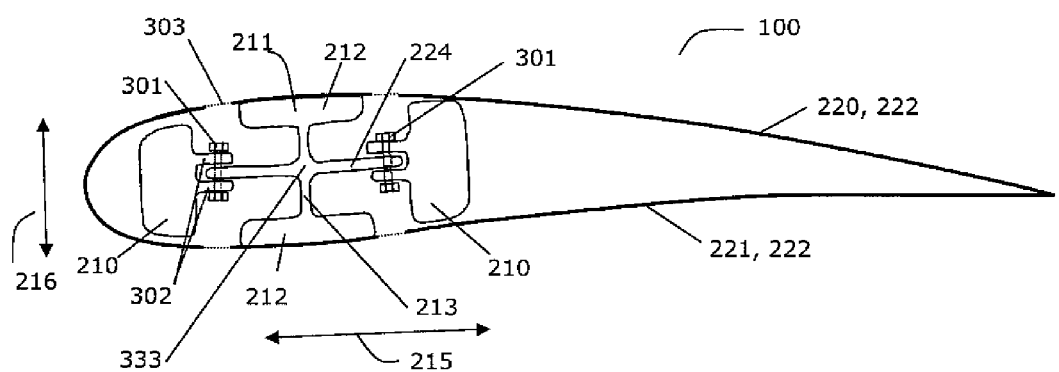
FIG. 3 is a cross sectional view of the spar joint of the sectional blade of FIG. 1.

Both spar sections 201, 202 have an elongated form and the first spar section 201 is shaped to facilitate that the spar bridge 104 can be received by and connected to the first spar section 201 allowing the blade sections to be joined in a spar joint around the spar bridge 104, as illustrated by the arrow 206. In FIG. 3 is illustrated the same sectional blade as assembled and as seen in a cross sectional view of the blade 100 and the spar joint.

As illustrated in FIGS. 2 and 3, the spar bridge 104 comprises two spar caps 210 extending lengthwise in the longitudinal direction of the blade section. Further, the caps are oriented in the blade thickness direction 216 between the leeward or upper shell part 220 and windward or lower shell part 221 of the blade, i.e. transversely to the chordwise direction 215 of the blade. The spar bridge is connected to the receiving spar section 201, which comprises a center beam 211 of two beam caps 212 joined by a beam web 213. The beam caps 212 are oriented in a chordwise direction 215 of the blade and thereby transversely to the spar caps 210. The upper and lower beam caps 212 primarily take up the flexural and bending forces, while the beam web 213 is primarily loaded in shear, making the center beam efficient for carrying both bending and shear in the plane of the beam web. One of the beam caps or both may form an integrated part of the blade shell 222 and may form part of the aerodynamic outer surface of the blade. Alternatively the beam caps 212 may be attached to the blade shell, such as, for example, by adhesives. The center beam 211 further comprises a further web 224 (here called the spar web) oriented transversely to the beam web 213. The spar joint is then formed by the connection of the spar bridge 104 to the receiving spar section 201 by fastening the two spar caps 210 to the spar web 224 on either side of the center beam 211 as can be seen in FIG. 3. The blade joint thereby is substantially formed by two interconnected I-beams each with a web 213, 224 approximately or substantially passing through the centroid 333 of the cross section of the blade.

As illustrated in FIGS. 2 and 3 the two legs or spar caps 210 of the spar bridge 104 may be fastened to the receiving spar section 201 by fastening members such as bolts 301. The spar caps 210 comprise one or more protrusion or extensions 302 for the connection to the spar web 224. The bolts 301 may be placed at intervals over the full spar joint length, over a part of it, or at either or both ends of the spar joint. To facilitate the joining and optional later non-destructive separation of the two blade sections, openings 303 may be provided in the blade shell 220 for access to the fastening members 301. Further, the spar bridge may be connected to the receiving spar section by means of adhesive instead of or in combination to the fastening members.

In the illustrated embodiment of the invention, both the spar caps and the beam caps are placed at maximum distances apart within the sectional blade thereby yielding maximum bending and shear stiffness in the blade joint both for flapwise and edgewise bending of the blade. The center beam in the blade joint primarily acts to take up the flapwise bending of the blade while the two spar caps of the spar bridge interconnected with the spar web acts to take up the edgewise bending of the blade.

By interconnecting the two legs or spar caps of the spar bridge with the spar web over a length of the blade joint, the spar caps will not act as independent cantilevers but be fully connected in shear and act in common to take up any edgewise bending and shear loads of the blade over the blade joint.

In FIG. 2 the spar bridge 104 joining the spar sections comprises the two extending spar caps. Instead or in addition hereto the center beam could extend from the first blade section and into the other blade section thereby forming a spar bridge. This would yield the same cross sectional view of the blade joint as illustrated in FIG. 3.

In the shown embodiments, the spar bridge as well as each of the spar sections may comprise laminates of layers of, such as, for example, fiber reinforced materials. As the spar and center beam webs primarily act to take up shear forces, these elements may advantageously comprise layers of fiber reinforced materials with the fibers oriented in +/−45 degrees. The caps may comprise layers of fibers primarily oriented substantially in the longitudinal direction of the blade for maximal bending stiffness of the beams.

Figure 4:
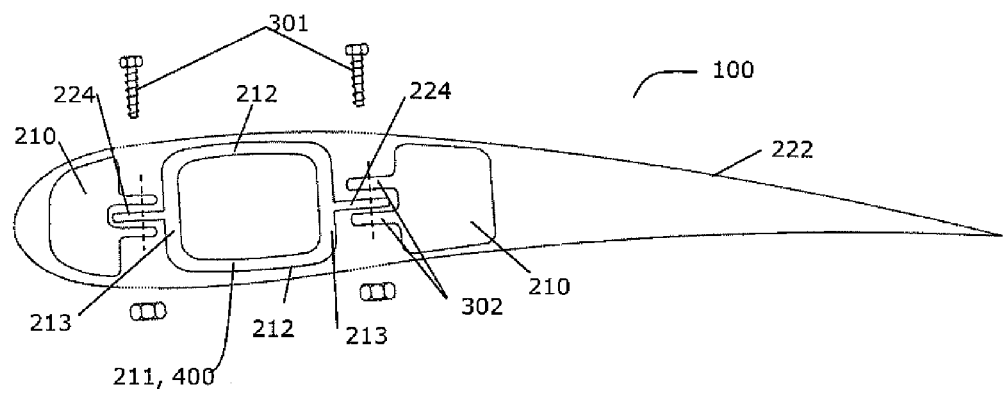
FIG. 4 illustrates a spar joint where the center beam is box-shaped.

FIG. 4 illustrates an embodiment of a blade joint likewise as seen in a sectional view through the joint. Here, the center beam 211 is shaped as a box-beam 400 comprising two beam caps 212 and two beam webs 213 joining the beam caps. The spar joint further comprises two spar caps 210 to be fastened to the center box-beam 400 via the spar webs 224 and by means of bolts 301. The bolts 301 may be positioned during the joining of the blade sections through openings 303 in the blade shell 222. The spar caps may alternatively or in addition to the bolts be attached to the center beam 211 via the spar webs by means of adhesive.

Figure 5:
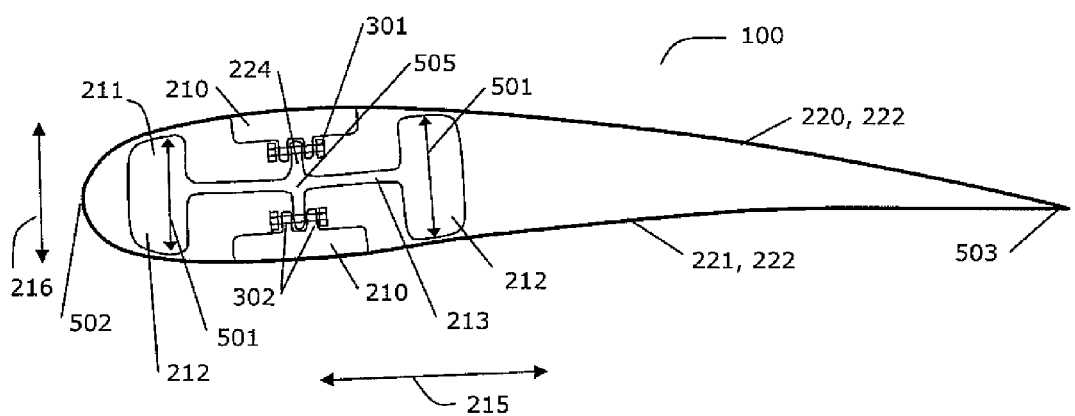
FIG. 5 illustrates a further embodiment of a spar joint according to the invention.
Figure 6:
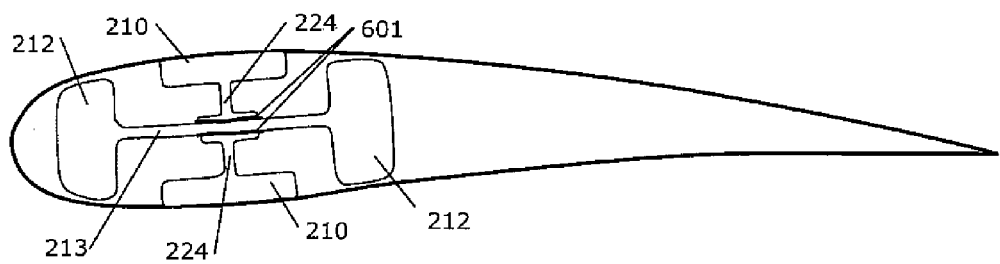
FIG. 6 illustrates yet another embodiment of a spar joint according to the invention.

In FIGS. 5 and 6 are shown two other embodiments of the blade joint in cross sectional views. As in the previously shown embodiments, the center beam 211 extends in the longitudinal direction of the blade and comprises two beam caps 212. Here the center beam is oriented such that the two beam caps 212 of widths 501 extend between the leeward (or upper) 220 and windward (or lower) 221 shell parts of the blade transverse to the chord direction 215. The two beam caps are positioned towards the leading 502 and trailing 503 edges of the blade, respectively, to increase the bending stiffness of the center beam 211 under edgewise bending of the blade.

In FIG. 5 the center beam 211 further comprises a spar web 224 oriented transversely to the center beam web 213, and oriented such that both the center beam web 213 and the spar web 224 substantially pass through the centroid 505 of the cross section of the sectional blade comprising the spar joint. The two spar caps 210 extending in the chordwise direction 215 of the blade are oriented transversely to the center beam caps and are connected to the spar web and thereby the center beam by means of bolts 301 as sketched in FIG. 5. The blade joint thus comprises two substantially interconnected I-beams for maximized edgewise and flapwise bending stiffness over the blade joint and with maximized shear transfer over the webs over the whole blade joint length.

The blade joint illustrated in FIG. 6 is similar to the joint in FIG. 5, only here a spar web 224 is attached directly to each of the two spar caps 210. The blade sections are then joined by fastening of the spar webs 224 and thereby the spar caps 210 to the center beam web 213 by means of, for example, adhesive 601.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A sectional blade for a wind turbine, the blade comprising at least a first blade section and a second blade section extending in opposite directions from a blade joint, where each blade section comprises a spar section forming a structural member of the blade and extending lengthwise, the first blade section and the second blade section being structurally connected by a spar bridge extending into said first and second blade sections to facilitate joining of said blade sections, the spar bridge being connected in a spar joint to a spar section defining a receiving spar section for receiving the spar bridge, the spar joint comprising a center beam extending lengthwise and including at least two beam caps joined by a beam web, and the spar joint further comprising at least two spar caps extending lengthwise and a spar web extending lengthwise and connecting the spar caps to opposite sides of the beam web in a chordwise direction.

2. The sectional blade according to claim 1, wherein the spar bridge forms an integral part of the first spar section, and wherein the second spar section defines the receiving spar section for receiving the spar bridge over a spar joint length so as to secure the spar bridge to the second spar section in the spar joint.

3. The sectional blade according to claim 1, wherein the spar bridge includes a separate member from the first and second spar sections, and each of the first and the second spar sections define receiving spar sections for receiving the spar bridge over a spar joint length so as to secure the spar bridge to the first and second spar sections in spar joints.

4. The sectional blade according to claim 1, wherein the beam caps are oriented in a direction transverse to the spar caps.

5. The sectional blade according to claim 1, wherein the beam web is oriented in a direction transverse to the spar web.

6. The sectional blade according to claim 1, wherein the spar bridge comprises the center beam, and the receiving spar section comprises the at least two spar caps.

7. The sectional blade according to claim 1, wherein the receiving spar section comprises the center beam, and the spar bridge comprises the at least two spar caps.

8. The sectional blade according to claim 1, wherein the center beam is box-shaped.

9. The sectional blade according to claim 1, wherein the center beam is I-shaped.

10. The sectional blade according to claim 1, wherein the spar joint comprises two interconnected I-beams.

11. The sectional blade according to claim 1, wherein both the spar web and the beam web pass through the centroid of a cross section of the sectional blade comprising the spar joint.

12. The sectional blade according to claim 1, further comprising a fastening element adapted to fasten the spar bridge to the receiving spar section.

13. The sectional blade according to claim 12, wherein the receiving spar section receives the spar bridge over a spar joint length, and wherein a number of fastening elements are provided at intervals along the spar joint length.

14. The sectional blade according to claim 12, wherein fastening elements are provided near both lengthwise ends of the spar joint.

15. The sectional blade according to claim 1, wherein the at least two spar caps are positioned a maximum distance apart within the sectional blade.

16. The sectional blade according to claim 1, wherein at least one of the spar sections forms part of an aerodynamic surface of the blade.

17. The sectional blade according to claim 1, wherein the spar joint facilitates disassembling of the blade sections from each other.

18. The sectional blade according to claim 1, wherein said second blade section forms a winglet.

19. A wind turbine comprising a sectional blade, the blade comprising at least a first blade section and a second blade section extending in opposite directions from a blade joint, where each blade section comprises a spar section forming a structural member of the blade and extending lengthwise,
the first blade section and the second blade section being structurally connected by a spar bridge extending into said first and second blade section to facilitate joining of said blade sections,
the spar bridge being connected in a spar joint to a spar section defining a receiving spar section for receiving the spar bridge,
the spar joint comprising a center beam extending lengthwise and including at least two beam caps joined by a beam web, and
the spar joint further comprising at least two spar caps extending lengthwise and a spar web extending lengthwise and connecting the spar caps to opposite sides of the beam web in a chordwise direction.

20. A method of manufacturing a sectional blade for a wind turbine, comprising:
positioning a first blade section adjacent to a second blade section in the lengthwise direction of the blade, each blade section including a lengthwise-extending spar section forming a structural member of the blade,
joining and connecting the first blade section with the second blade section using a spar bridge, wherein the spar bridge extends into the first blade section and the second blade section, and
forming a spar joint connecting the spar bridge with a spar section defining a receiving spar section, the spar joint including a center beam extending lengthwise and including at least two beam caps joined by a beam web, and at least two spar caps extending lengthwise and a spar web extending lengthwise and connecting the spar caps to opposite sides of the beam web in a chordwise direction.

* * * * *